United States Patent [19]

Sanbayashi et al.

[11] Patent Number: 5,349,816
[45] Date of Patent: Sep. 27, 1994

[54] EXHAUST EMISSION CONTROL SYSTEM

[75] Inventors: Daisuke Sanbayashi, Toyota; Osamu Hirako, Okazaki; Yoshiaki Danno; Kazuo Koga, both of Kyoto, all of Japan

[73] Assignee: Mitsubishi Jidosha Kogyo Kabushiki Kaisha, Tokyo, Japan

[21] Appl. No.: 19,902

[22] Filed: Feb. 19, 1993

[30] Foreign Application Priority Data

| Feb. 20, 1992 | [JP] | Japan | 4-033727 |
| Feb. 20, 1992 | [JP] | Japan | 4-033728 |
| Feb. 20, 1992 | [JP] | Japan | 4-033729 |

[51] Int. Cl.$^5$ ............................................. F01N 3/28
[52] U.S. Cl. ....................................... 60/277; 60/288; 60/301; 422/171
[58] Field of Search .................. 60/288, 277, 301; 422/171

[56] References Cited

U.S. PATENT DOCUMENTS

| 3,440,817 | 4/1969 | Saufferer | 60/288 |
| 4,510,749 | 4/1985 | Taguchi et al. | |
| 4,817,385 | 4/1989 | Kumagai | |
| 5,060,473 | 10/1991 | Nakagawa | 60/277 |
| 5,085,050 | 2/1992 | Katoh | 60/288 |
| 5,233,830 | 8/1993 | Takeshima | 60/288 |

FOREIGN PATENT DOCUMENTS

| 0433772 | 12/1990 | European Pat. Off. |
| 0406507 | 3/1991 | European Pat. Off. |
| 9004614 | 11/1991 | Fed. Rep. of Germany |
| 3-225013 | 10/1991 | Japan |
| 4-35724 | 2/1992 | Japan |

OTHER PUBLICATIONS

SAE Journal, "GM's Catalytic Converter", Homfeld et al., p. 33, left column, paragraph 5; FIG. 1 (1962).

Primary Examiner—Douglas Hart

[57] ABSTRACT

An exhaust emission control system for a motor vehicle is disposed in an exhaust path, comprises a first catalyst for purifying an exhaust gas during activation of an engine, a second catalyst disposed downstream of the first catalyst and including a lean NOx catalyst, a bypass detouring the first catalyst, a select valve for controlling the amount of exhaust gas to be introduced into the bypass and first catalyst, and a control unit for controlling the select valve and flow of the exhaust gas according to operating status of the engine.

18 Claims, 16 Drawing Sheets

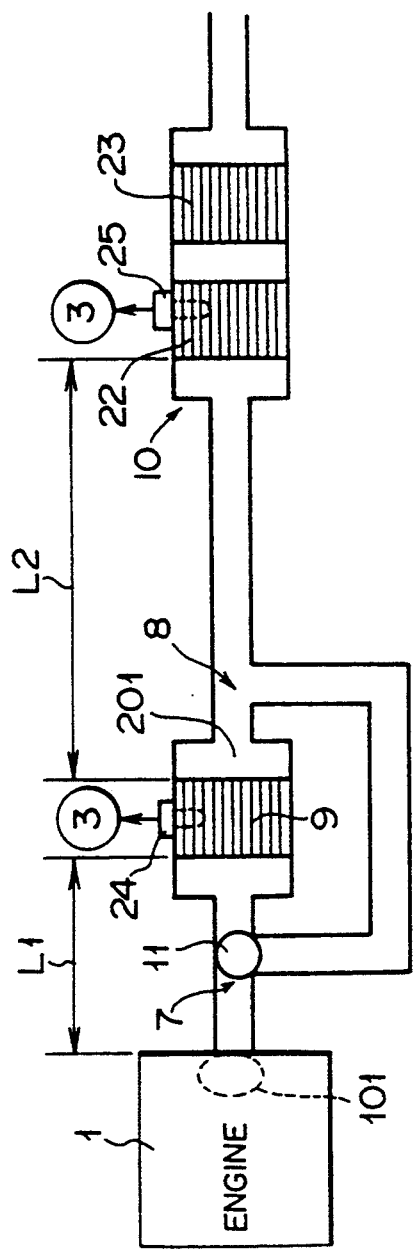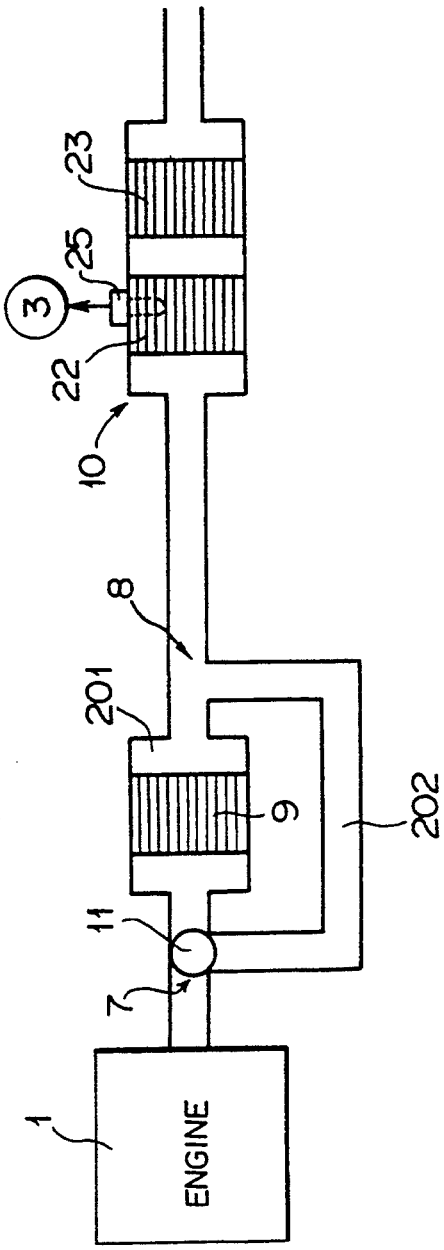
F I G. 2(a)
F I G. 2(b)

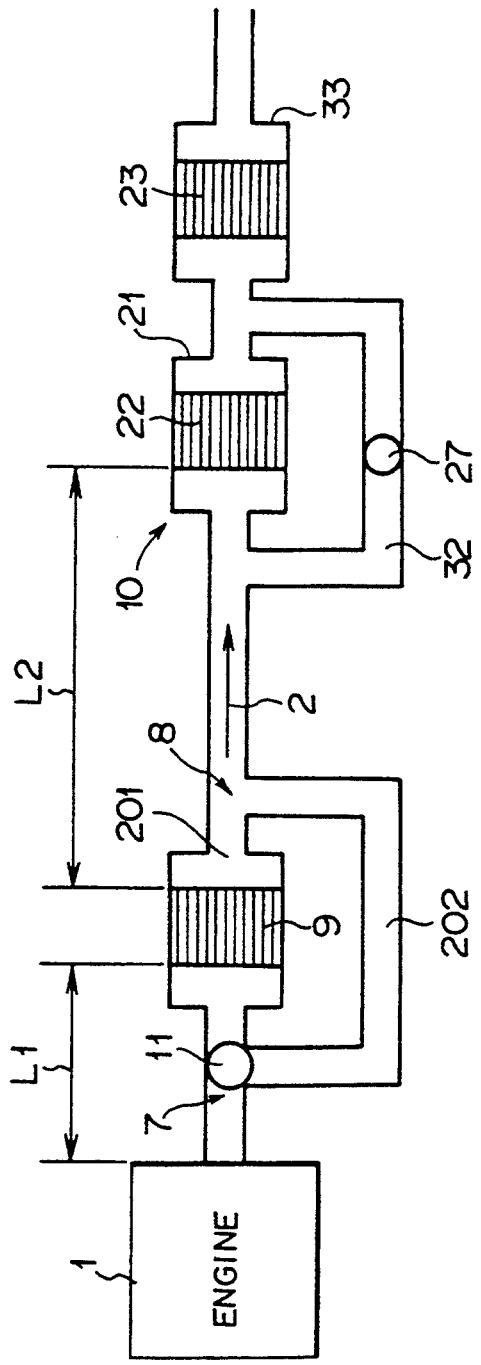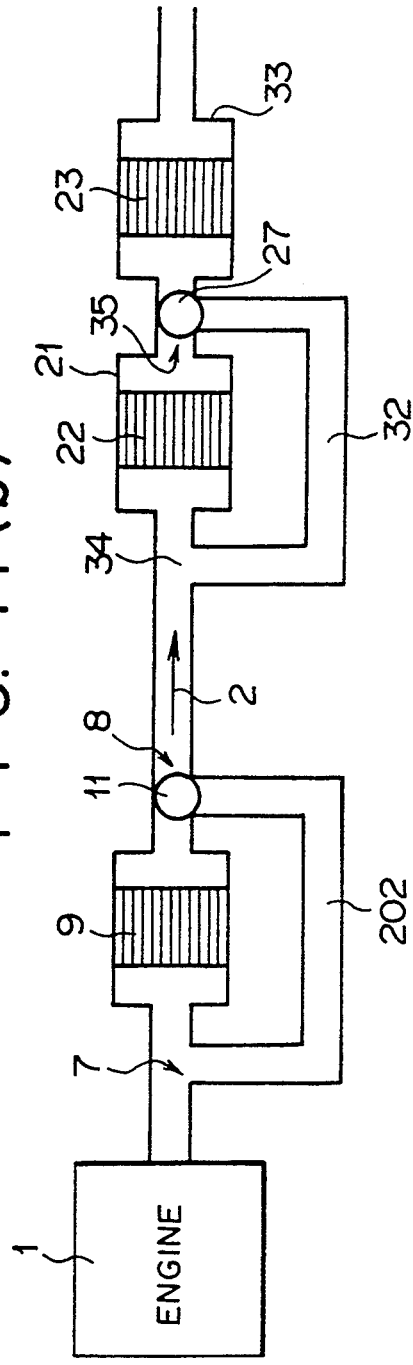

EXHAUST EMISSION CONTROL SYSTEM

BACKGROUND OF THE INVENTION

1. Field of the Invention

This invention relates to an exhaust emission control system for an internal combustion engine of a motor vehicle.

2. Description of Related Art

At present, an exhaust emission control system is used for detoxifying an exhaust gas emitted by a motor vehicle so as to discharge a nontoxious gas into air, and plays an important role for ecology.

One of such exhaust emission control systems is a three way catalyst which includes an oxidation catalyst and a reduction catalyst. When the air/fuel ratio is maintained in the narrow window including the stoichiometric ratio, the oxidation catalyst oxidizes carbon monoxide CO and hydro carbons HC, and the reduction catalyst reduces the nitrogen oxides NOx, so that the exhaust gas can be converted into a nontoxious gas.

To operate the engine more effectively at a reduced cost, it is considered to be advantageous to use a fuel mixture whose air/fuel ratio is above the stoichiometric ratio, i.e. "lean". A number of motor vehicles incorporated an engine operating on a lean air/fuel mixture have been developed up now. The three way catalyst can function effectively as the exhaust emission control system when the air/fuel ratio is the stoichiometric ratio. The three way catalyst however has a rather poor catalytic function when excess oxygen is present in the mixture (i.e. lean), and is difficult to satisfy the emission regulation.

To overcome this problem, Japanese Patent Laid-Open Publication No. Sho 60-125,250 exemplifies a catalyst which can reduce the nitrogen oxides NOx in a lean exhaust gas. This catalyst is called "lean NOx catalyst" hereinafter.

The lean NOx catalyst tends to age under a high temperature and requires hydro carbons while reducing NOx, which makes the catalyst disadvantageous to be installed in the motor vehicle.

The lean NOx catalyst cannot exhibit its sufficient NOx purifying ratio ($\eta_{NOx}$) and cannot function effectively until the ratio of hydro carbons and carbon monoxide reaches a predetermined value in the exhaust gas as shown in FIG. 4 of the accompanying drawing figures. Therefore, when the lean NOx catalyst and the three three-way catalyst are disposed in an exhaust path, it is necessary to position the lean NOx catalyst upstream of the three way catalyst so as to keep sufficient hydro carbons.

To enhance purification of the exhaust gas as soon as the engine is started, it is necessary to activate the catalyst as quickly as possible. For this purpose, a relatively small first catalyst (warm-up catalyst) is disposed near an exhaust port of the combustion chamber of the engine, and a second main catalyst is disposed downstream of the first catalyst. Thus, the first catalyst composed of the three way catalyst is early heated to be active, so that the exhaust gas can be quickly and effectively purified after the engine is started.

The stricter the emission regulation, the more demand will be placed on the warm-up catalysts in the future. When the three way catalyst which requires hydro carbons to purify NOx is used as the worm-up catalyst without any modification, the lean NOx catalyst in the main catalyst cannot function normally because of an insufficient amount of hydro carbons. On the other hand, since the lean NOx catalyst is abruptly aged under a high temperature, it cannot be applied as the warm-up catalyst as it is.

Furthermore, the lean NOx catalyst tends to age extensively when the engine is working with a rich mixture in which excess fuel is present, or a mixture having the stoichiometric ratio.

SUMMARY OF THE INVENTION

It is an object of this invention to provide an exhaust emission control system for a motor vehicle, which comprises a first catalyst and a second catalyst. The second catalyst includes a lean NOx catalyst at least a part thereof. The exhaust emission control system is designed so as to assure reliable function of the lean NOx catalyst depending upon the operating status of the engine.

According to a basic configuration of the invention, the exhaust emission control system comprises: a first catalyst for purifying an exhaust gas at the initial stage of engine operation, the first catalyst being disposed in an exhaust path near an internal combustion engine; a second catalyst disposed downstream of the first catalyst, the second catalyst including a lean NOx catalyst for purifying nitrogen of oxides in a lean exhaust gas; a first bypass detouring the first catalyst and converging with the exhaust path upstream of the second catalyst; a first select valve for controlling the amount of exhaust gas to be introduced to the first bypass and the first catalyst; and a control means for providing the first select valve with signals indicative of of positions of the first select valve.

In this configuration, an exhaust gas is introduced into the first catalyst by controlling the select valve only when necessary, so that the lean NOx catalyst in the second catalyst can function efficiently for a long period of time.

When the engine is recognized to be non-operated, the select valve is controlled to a position to open the bypass. In case of trouble, the select valve is designed to stay at the foregoing position, thereby introducing the exhaust gas to the second catalyst, and preventing the first catalyst from being overworked and damaged.

When the engine is not considered to be wormed up sufficiently, the select valve is moved to a position to close the bypass so that a relatively cool exhaust gas can be purified by the first catalyst which becomes active early after the engine is started.

When the first catalyst is considered to be sufficiently active but the second catalyst is not, the select valve is moved to an intermediate position so as to preheat the bypass before the exhaust gas is cooled in the fully opened bypass. Therefore, the second catalyst is protected against its reduced efficiency resulting from the cool exhaust gas.

The select valve is moved to a position to open the bypass when the engine is operating on a lean air/fuel mixture. In such a case, the exhaust gas containing hydro carbons is supplied to the lean NOx catalyst via the bypass. On the contrary, when air/fuel mixture is not lean, the select valve is moved to the position for introducing the exhaust gas to the first catalyst.

The exhaust emission control system further comprises: a second bypass detouring the lean NOx catalyst in the second catalyst and converging the exhaust path, and a second select valve for controlling the amount of exhaust gas to be introduced to the second bypass or the lean NOx catalyst. Thee control means controls positions of the first and second select valves.

This arrangement allows the lean NOx catalyst in the second catalyst to function efficiently and be protected against damage.

When the engine is found to be non-operated, the first select valve is moved to the position to open the first bypass, and the second select valve is moved to the position to close the second bypass. Therefore, even when the first select valve sticks to the inner wall of the exhaust pipe, hydro carbons can be supplied to the lean NOx catalyst via the first bypass, thereby allowing the lean NOx catalyst to operate efficiently, and protecting the first catalyst against a hot exhaust gas.

When a temperature of the lean NOx catalyst is found to be above the predetermined value, the second select valve is moved to the position to open the second bypass, thereby protecting the lean NOx catalyst from the hot exhaust gas.

Furthermore, the exhaust emission control system comprises: an air actuator which drives the first select valve and includes a negative pressure chamber, a diaphragm coupled to the first select valve and a return spring for pushing the diaphragm; and a valve which raises a negative pressure in the negative pressure chamber, closes the first bypass against the force of the return spring and controls supply of the negative pressure in response to a control signal from the control means. In case of trouble, the select valve is designed to be held at the position to open the first bypass so as to prevent the first catalyst from being overworked and damaged.

BRIEF DESCRIPTION OF THE INVENTION

FIG. 2(a) is a schematic view showing the structure of the exhaust emission control system of FIG. 1.

FIG. 2(b) is a view similar to FIG. 2(a) showing a second embodiment of the exhaust emission control system.

FIG. 14(a) is a schematic view showing the arrangement of the system of FIG. 13.

FIG. 14(b) is a schematic view showing arrangement of the exhaust emission control system according to a seventh embodiment.

In all Figures identical parts have identical reference numbers.

DESCRIPTION OF THE PREFERRED EMBODIMENTS

Figure 1:
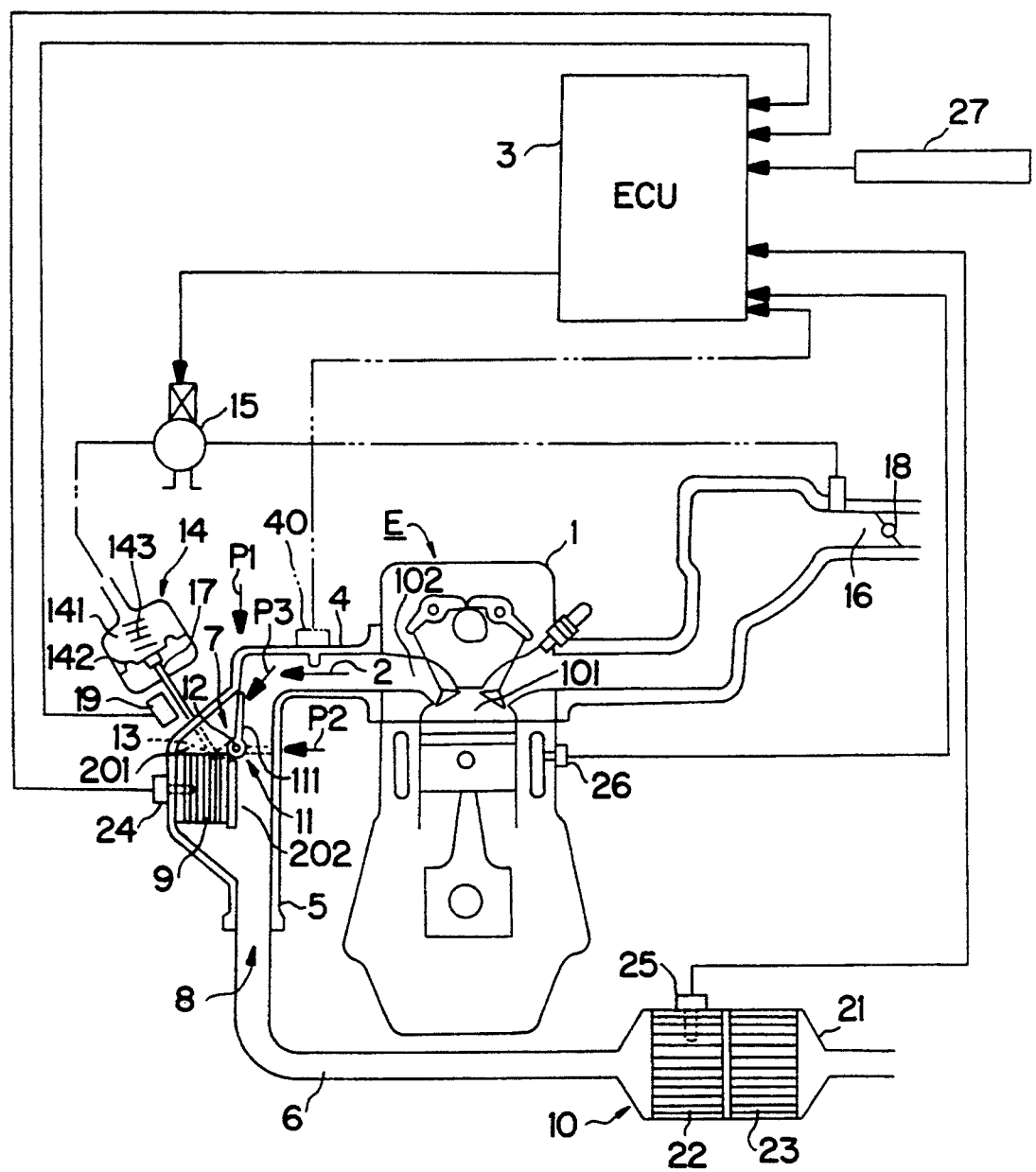
FIG. 1 is a schematic view showing the overall configuration of an exhaust emission control system according to a first embodiment of the present invention.

The exhaust emission control system shown in FIGS. 1 and FIG. 2(a) is disposed on an exhaust path 2 of a gasoline engine E.

The engine E is controlled its amount of fuel by an engine control unit (called "ECU" hereinafter) 3, which controls an actual air/fuel ratio to a target air/fuel ratio in response to current load information and engine speed information.

The exhaust path 2 extends from an exhaust manifold 4 (connected to the engine body 1), and comprises an upstream exhaust pipe 5 having a first (warm-up) catalyst 9, a downstream exhaust pipe 6 having a second catalyst 10, and a muffler (not shown).

The upstream exhaust pipe 5 is divided at a portion 7 into an upstream main path 201 including the first catalyst 9, and a path 202 detouring the first catalyst 9 and converging to the exhaust path at a portion 8. A select valve 11 is disposed at the portion 7 so as to control the amount of an exhaust gas to be conducted to the upstream main path 201 and the bypass 202. The select valve 11 includes a shaft 12 rotatably supported at the portion 7, so that a lever 13 integral with the shaft 12 is turned by an air actuator 14 to open a valve body 111 to a predetermined extent.

The air actuator 14 includes a negative pressure chamber 141, a diaphragm 142 which confronts with the negative pressure chamber 141 and is coupled to the lever 13 via a link 17, and a return spring 143 for pushing the diaphragm 142. The negative pressure chamber 141 communicates via a duty valve 15 with an inlet path 16 which is behind a throttle valve 18 serving as a negative pressure source. The air actuator 14 for driving the select valve 11 may be replaced with a stepper motor and a conventional drive mechanism including a gear train for transmitting the rotational force of the stepper motor to the shaft 12.

The duty valve 15 is controlled by the ECU 3. When the duty valve 15 is off while its duty ratio is 0%, it completely releases the negative pressure chamber 141 to the atmosphere. The higher the duty ratio, the duty valve 15 increases the negative pressure in the negative pressure chamber 141 so that the lever 13 be strongly pulled against the force of the return spring 143. When the duty ratio of the valve 15 is below a predetermined level, the valve body 111 of the select valve 11 is urged by the elasticity of the return spring 143 to stay at a first position P1 (shown by a solid line in FIG. 1), thereby fully opening the bypass 202 and closing the upstream main path 201.

When the duty ratio of the valve 15 is above the predetermined level, the valve body 111 of the selector valve 11 follows the operation of the diaphragm 142 against the return spring 143 and reaches a second position P2 where it closes the bypass 202 and opens the upstream main path 201 (shown by a dash-and-two-dot line in FIG. 1).

The link 17 includes a valve opening sensor 19, which provides an analog to digital converter (not shown) with an analog output indicative of the position of the select valve 11. Then, the analog to digital converter provides a digital output to the ECU 3.

In the upstream main path 201, the first catalyst 9 is disposed relatively near the exhaust port 102 of the combustion chamber 101 of the engine body 1. The second catalyst 10 is at a position relatively distant from the engine body 1. The first catalyst 9 is a three way catalyst, and is much smaller than the second catalyst 10.

The first catalyst 9 includes a monolithic substrate which has a well-known three way catalytic substrate attached on its inner surface. When an exhaust gas has the stoichiometric air/fuel ratio and is hot enough to activate the catalyst, the exhaust gas passing through the monolithic substrate is subject to oxidization and reduction of HC, CO and NOx, thereby being discharged as a nontoxious gas. The three way catalyst as the first catalyst 9 may be replaced with an oxidation catalyst such as palladium (Pd) catalyst so as to make the exhaust emission control system less expensive. The palladium catalyst becomes active at a relatively low temperature.

The second catalyst 10 is disposed on the downstream exhaust pipe 6 which is next to the converging portion 8 of the upstream exhaust pipe 5. The second catalyst 10 includes a lean NOx catalyst 22 and a three way catalyst 23, which are housed in a cylindrical container 21 along the moving direction of the exhaust gas. In this embodiment, the lean NOx catalyst 22 and the three way catalyst 23 are housed in one container so as to make the second catalyst 10 compact. They may be housed in different containers, which are disposed side by side.

Figure 4:
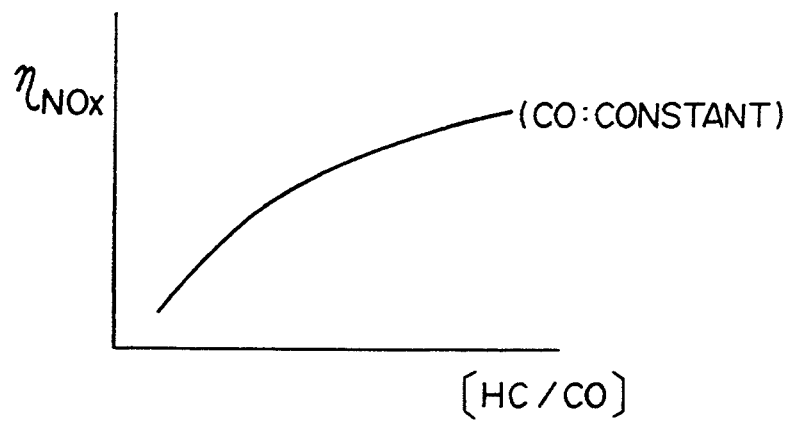
FIG. 4 is a graph showing the purifying characteristics of a lean NOx catalyst.

The lean NOx catalyst 22 includes a monolithic substrate which has catalytic active substance attached on the surface thereof. This catalytic active substance can reduce NOx in the exhaust gas containing excess oxygen (having the lean air/fuel ratio), and has a characteristic which exhibits a high NOx purification ratio ($\eta_{NOX}$) as-shown in FIG. 4 when the ratio of HC/CO is above the predetermined level. In other words, when the exhaust gas has the lean air/fuel ratio and is hot enough to activate the catalyst, the lean NOx catalyst 22 can reduce and detoxify NOx by using HC as a reductant.

The three way catalyst 23 of the second catalyst 10 is much larger than the first catalyst 9, and includes a known catalytic active substance which is applied on a monolithic substrate and can perform oxidation and reduction in the exhaust gas having the stoichiometric air/fuel ratio. The second catalyst 10 including the lean NOx catalyst 22 and the three way catalyst 23 can extensively detoxify the exhaust gas.

As shown in FIG. 2(a), a length L1 of the exhaust path between the combustion chamber 101 and the first catalyst 9 is shorter than a length L2 between the first and second catalysts 9 and 10, thereby enhancing the performance of the first catalyst 9 and making the lean NOx catalyst 22 durable.

The ECU 3 is mainly a microcomputer, and controls fuel supply to the engine E, ignition timing and operation of the throttle valve and the select valve. For this purpose, the ECU 3 has an access to not only the valve opening sensor 19 but also to various sensors such as a first catalyst temperature sensor 24 in the first catalyst 9, a second catalyst temperature sensor 25 in the lean NOx catalyst 23, a water temperature sensor 26 in the engine body 1, and an engine speed sensor 27. The ECU 3 receives various data from these sensors.

The ECU 3 functions as a valve control unit, which provides the air actuator 14 with a valve control signal indicative of the position of the select valve 11.

The operation of the exhaust emission control system of FIG. 1 will be described with reference to the control program of the ECU3 (shown in FIG. 5) and the wait time calculating map of FIG. 3.

Figure 5:
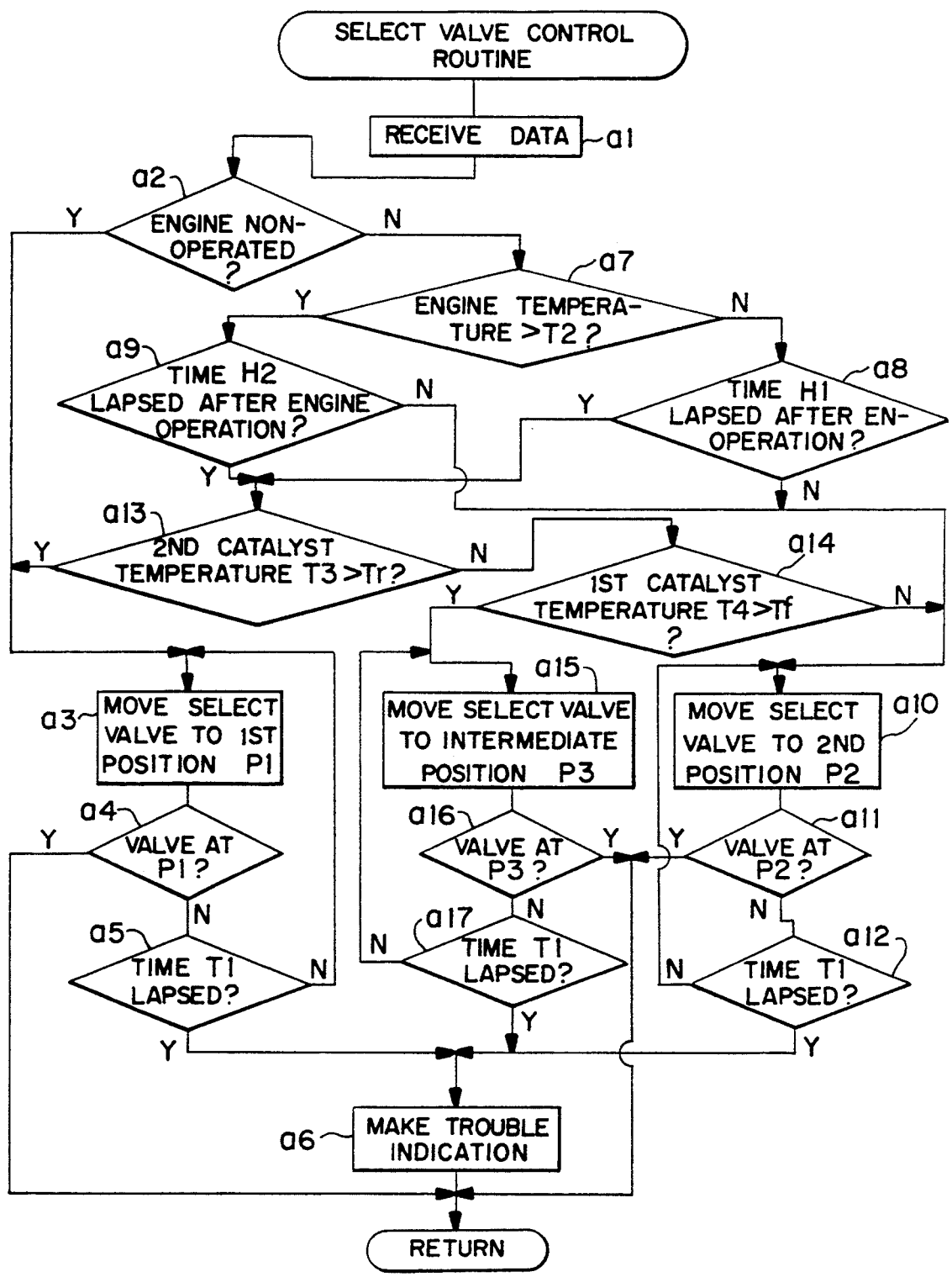
FIG. 5 is flow chart of a select valve control routine carried out by the ECU of the exhaust emission control system of FIG. 1.

In the select valve control routine shown in FIG. 5, the ECU 3 reads data from the foregoing sensors, and stores them in specified areas. In step a2, the ECU 3 checks whether or not an engine speed Ne is below a predetermined value Ne1 indicative of non-operation of the engine. When the engine speed Ne is below Ne1, the ECU 3 judges that the engine is non-operative, and advances to step a3. The ECU 3 keeps the output for the duty valve 15 to the ratio 0% so that the select valve 11 is made to stay at the first position P1 to close the upstream main path 201. Thereafter, the duty valve 15 is closed. The negative pressure chamber 141 is released to the atmosphere, thereby moving the select valve 11 to the first position P1.

In steps a4 and a5, the ECU 3 detects arrival of the select valve 11 at the first position P1 according to the output from the valve opening sensor 19. Then, the ECU 3 returns. If the select valve does not reach the first position P1 in a predetermined period of time T1, the ECU 3 sends an output indicative of trouble in step a6, and returns.

On the other hand, when the engine is recognized to be working in step a2, the ECU 3 goes to step a7. In step a7, the ECU 3 reads an output from the water temperature sensor 26 as an engine temperature, and checks whether or not the temperature is above a value T2 indicative of completion of warm-up. When the engine temperature is below T2, the ECU 3 advances to step a8. Otherwise, the ECU 3 goes to step a9. In the former case, the ECU 3 reads a relatively long wait time H1 from the wait time calculating map of FIG. 3. During the wait time H1, the ECU 3 goes to step a10, and controls the select valve 11 to the second position P2, thereby opening the upstream main path 201 and closing the bypass 202. After lapse of the wait time H1, the ECU 3 goes to step a13.

In steps a11 and a12, the ECU 3 waits until the select valve 11 reaches the second position P2, and returns after receiving the output from the valve opening sensor 19 which indicates the arrival of the select valve 11 at the second position P2. If the select valve 11 does not reach the second position P2 within the time T1, the ECU advances to step a6, gives the trouble indication, and returns.

Figure 3:
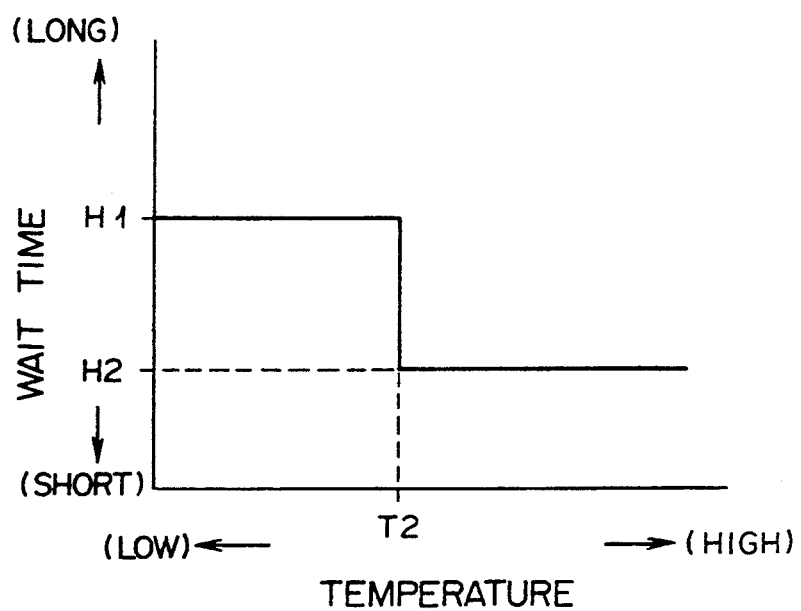
FIG. 3 is a map for calculating wait time by an engine control unit (ECU) of the exhaust emission control system of FIG. 1.

When the engine temperature is above the worm-up completion value T2, the ECU 3 advances to step a9, where the ECU 3 reads a relatively short wait time H2 from the wait time calculating map of FIG. 3. During the wait time H2, the ECU 3 goes to step a10, and controls the select valve 11 to the second position P2 to open the upstream main path 201 and close the bypass 202. After the lapse of the time H2, the ECU 3 advances to step a13.

When going to step a13 after the lapse of either the wait time H1 or H2, the ECU 3 receives data on the second catalyst temperature T3 from the second catalyst, temperature sensor 25. The ECU 3 checks whether the temperature T3 is above an activation completion temperature Tr (called "active temperature") for the second catalyst 10. When T3 is below Tr, the ECU 3 goes to-step a14. Otherwise, the ECU 3 advances to step a3. In step a14, the ECU 3 receives the first catalyst temperature T4 from the first catalyst temperature sensor 24. Then, the ECU 3 checks whether T4 is above the active temperature Tf of the first catalyst. When T4 is below Tf, the ECU 3 advances to step 10. In step a10, the ECU 3 keeps the select valve 11 at the second position P2 so as to open the upstream main path 201 and to raise the temperature in the first catalyst 9. When T4 becomes higher than Tf, the ECU 3 goes to step a15. In this embodiment, the first catalyst temperature T4 is derived from the first catalyst temperature sensor 24. It is also possible to obtain temperatures of the exhaust gas near the second and first catalysts so as to use them for temperature determination.

In step a15, when the first catalyst 9 reaches the active temperature Tf and the second catalyst 10 does not reach the active temperature Tr, the ECU 3 keeps the select valve 11 at an intermediate position P3. Thus, part of the exhaust gas is introduced into the bypass 202 so keep the bypass 202 heated beforehand, so that the exhaust gas is prevented from being cooled while passing through the bypass 202 when the select valve 11 is moved to the first position P1. Thus, the purifying efficiency of the second catalyst 10 is protected against being decreased due to a low temperature.

The intermediate position P3 of the select valve 11 is empirically set so as to regulate the amount of the exhaust gas to the upstream main path 201 and introduce part of the exhaust gas to the bypass 202. Furthermore, it is possible to keep the select valve 11 at the intermediate position P3 for a predetermined time Tw so that the bypass 203 can be sufficiently heated. In this case, step for wait time Tw processing may be added after step a16.

In steps a16 and a17, the ECU 3 waits until the select valve 11 reaches the intermediate position P3. After detecting arrival of the select valve 11 at the intermediate position P3 based on the output from the valve opening sensor 19, the ECU 3 returns. When the select valve 11 does not get to the position P3 within the wait time T1, the ECU 3 gives the trouble indication in step a6, and returns.

If the duty ratio of the duty valve 15 is 0% due to short-circuit, e.g. in the control circuitry, the negative pressure chamber 141 is released to the atmosphere, and the return spring 143 keeps the select valve 11 at the first position P1. In such a case, the select valve 11 might be stuck to the inner wall of the exhaust pipe. However, since the bypass 202 is opened, HC can be continuously introduced to the lean NOx catalyst 22, which can function efficiently to purify the exhaust gas. Furthermore, the first catalyst 9 can be protected against being aged by a high temperature since the upstream main path 201 is closed. The select valve 11 is designed to be held at the position P1 in case of trouble, the exhaust emission control system can function as usual.

In the foregoing embodiment shown in FIGS. 1 and 2(a), the exhaust emission control system uses the first catalyst temperature sensor 24 in the first catalyst 9 and the second catalyst temperature sensor 25 in the lean NOx catalyst sensor 22, and detects the time point when the first catalyst 9 is sufficiently heated to the active temperature Tf and the time point when the second catalyst 10 is not heated to the active temperature Tr. Under this condition, the select valve 11 is maintained at the intermediate position P3. Alternatively, as shown in FIG. 2(b), only the second catalyst temperature sensor 25 may be used to check whether the first catalyst 9 reaches the active temperature Tf and the second catalyst 10 does not reach the active temperature Tr, so that the select valve 11 is maintained at the intermediate position P3.

Figure 6:
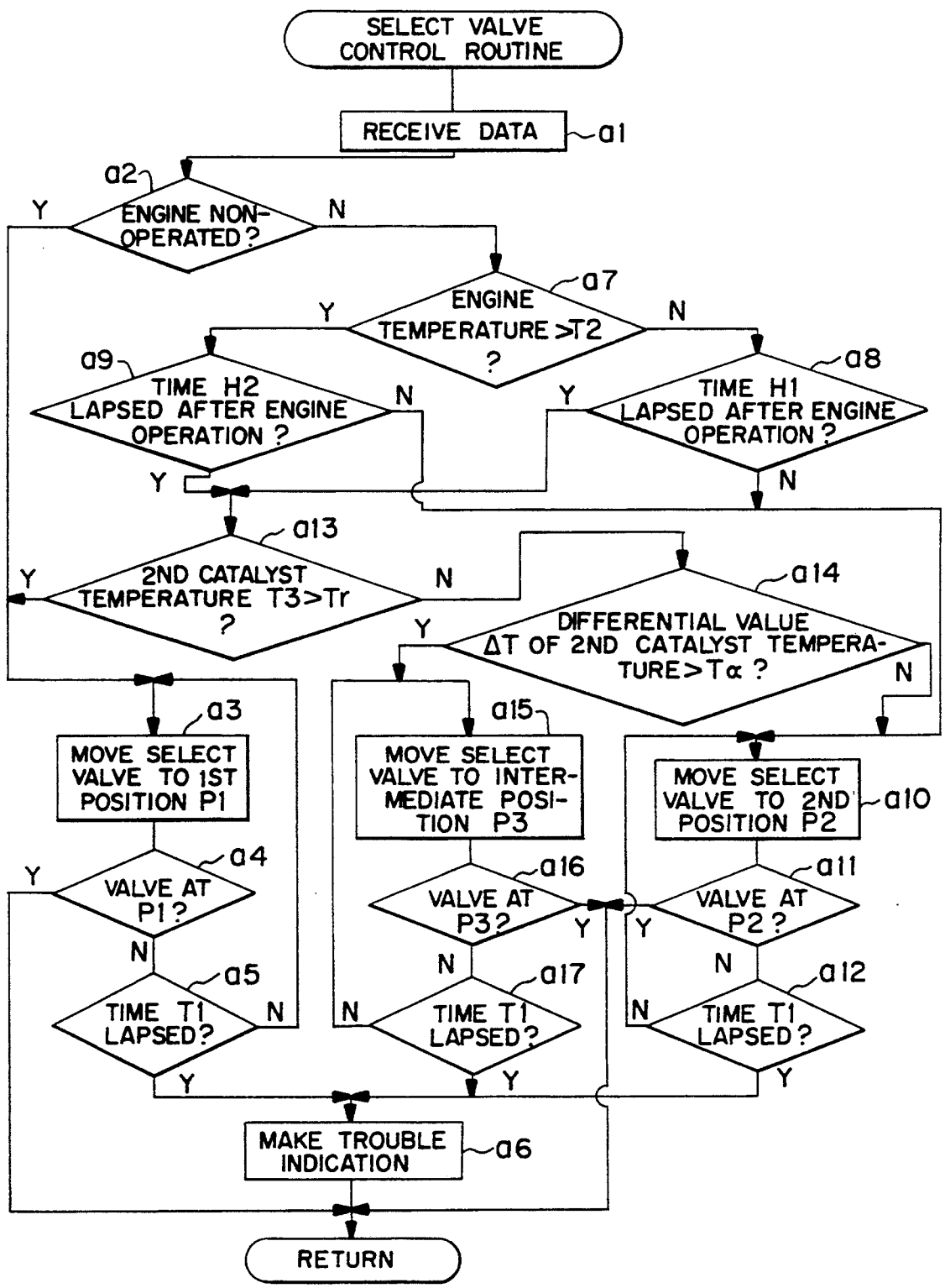
FIG. 6 is a flow chart of a select valve control routine performed by the ECU of the exhaust emission control system of FIG. 2(b).

The exhaust emission control system of FIG. 2(b) does not include the first catalyst temperature sensor 24, and differs from that of FIG. 2(a) only in this respect. Therefore, a further description will be omitted here. FIG. 6 shows the select valve control routine for the exhaust emission control system of FIG. 2(b). Since the routine of FIG. 6 differs from that of FIG. 5 only in step a14', description of the control routine will preceding to step a14' also be omitted here.

In the control routine of FIG. 6, the ECU 3 receives an exhaust gas temperature T3 from the second catalyst temperature sensor 25 in step a13. When the exhaust gas temperature T3 is below the active temperature Tr of the second catalyst 10, the ECU 3 advances to step a14'. Otherwise, the ECU 3 goes to step a3. In step a14', the ECU 3 calculates a differential value $\Delta T$ $(=|\Delta T_{n-1} - \Delta T_n|)$ of the exhaust gas temperature T3 in the second catalyst 10. The ECU 3 checks whether the level of $\Delta T$ is above the value $\Delta T\alpha$ corresponding to a temperature gradient indicative of the active temperature Tf of the first catalyst. When $\Delta T$ is below $\Delta T\alpha$, the ECU 3 advances to step 10, and keeps the select valve 11 at the second position P2 for opening the upstream main path 201 so as to raise the temperature of the first catalyst 9. When $|\Delta T$ is above $\Delta T\alpha$, the ECU3 goes to step a15 and keeps the select valve 11 at the intermediate position P3 so as to heat the bypass 202. The succeeding steps are carried out similarly to those of the select valve control routine shown in FIG. 5.

The configuration shown in FIG. 2(b) is advantageous in that the first catalyst temperature sensor 24 is dispensable. Alternatively, it is also possible to control the operation of the select valve 11 only by using the first catalyst temperature sensor 24 in place of the second catalyst temperature sensor 25.

Figure 7:
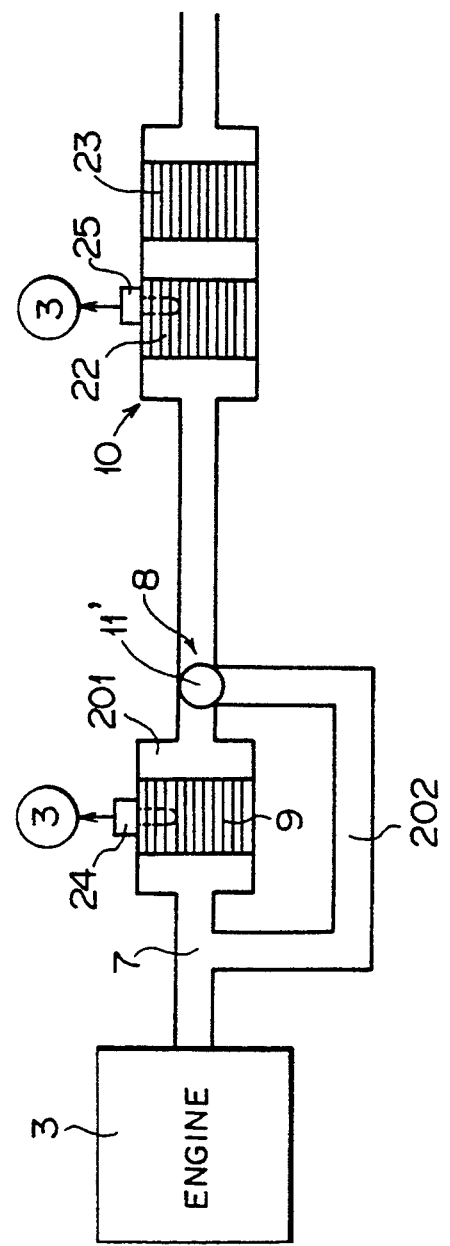
FIG. 7 is a schematic view showing the structure of the exhaust emission control system according to a third embodiment of the invention.
Figure 8:
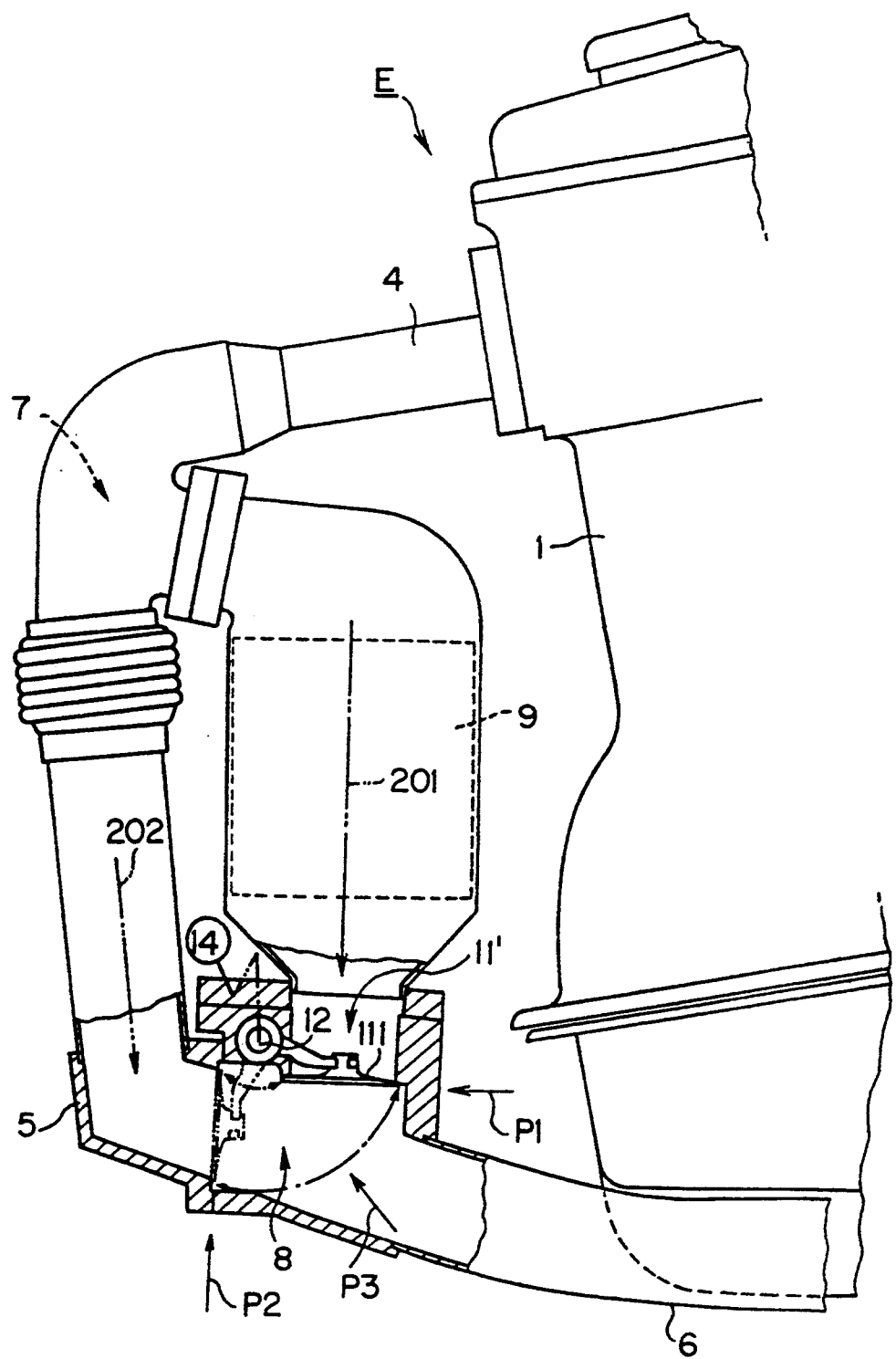
FIG. 8 is an enlarged cross-sectional view of a valve and an exhaust path of the exhaust emission control system of FIG. 7.

In the embodiment shown in FIG. 1, the select valve 11 is positioned at the portion 7. Alternatively, a select valve 11' may be positioned at the converging portion 8 downstream of the first catalyst 9 as shown in FIG. 7. FIG. 8 is a cross-sectional view of the select valve 11'.

The exhaust emission control system shown in FIGS. 7 and 8 (a third embodiment of the invention) is the same as that shown in FIG. 1 except for the position of the select valve 11'. A detailed description thereof will be omitted.

In this embodiment, the shaft 12 is rotatably supported at the position where the upstream exhaust pipe 5 and the downstream exhaust pipe 6 communicate with each other via the converging portion 8. Thus, both the shaft 12 and the select valve 11' are turned by the air actuator 14. The valve body 111 is selectively maintained at the first position P1 (shown by the solid line in FIG. 8), intermediate position P3 (not shown), or second position P2 (shown by the broken line in FIG. 8). This exhaust emission control system is as effective and advantageous as the exhaust emission control system of FIG. 1.

The exhaust emission control system of FIG. 1 uses the output of the water temperature sensor 26 as the temperature of the engine body 1. The temperature of the engine oil or of the wall of the cylinder block may be used in place of the water temperature.

In the embodiment of FIG. 1, the ECU 3 controls the select valve 11 according to the temperatures of the first and second catalysts. Alternatively, it is possible to successively change the position P1, P3 or P2 of the select valve 11 according to the time lapse after the activation of the engine. In this case, the temperature sensors are dispensable. Furthermore, it is also possible for the ECU 3 to select the position P1, P3 or P2 of the select valve 11 according to the temperatures of the first and second catalysts, and the time lapse after the activation of the engine. Thus, the position of the select valve 11 can be more reliably controlled according the warm-up conditions of the engine and the catalysts.

As described so far, in the embodiments of FIGS. 1 and 7, the exhaust gas can be introduced into the first catalyst by opening or closing the select valve only when necessary. Therefore, even when the lean NOx catalyst is disposed at least in a part of the second catalyst, the efficiency and durability of the lean NOx catalyst can be kept constant and reliable.

A fourth embodiment of the exhaust emission control system will be described with reference to FIGS. 9 to 11. The emission control system comprises the components same as those of the embodiment of FIG. 1 except for a linear air/fuel ratio sensor 40 in place of the first catalyst temperature sensor 24, and an ECU3' in place of the, ECU 3. Therefore, only these portions will be described with reference to FIG. 1.

The ECU3' has an access to the linear air/fuel ratio sensor 40 (shown by dash-and-two-dot line in FIG. 1) which is disposed in the exhaust path 2 and can output data on the air/fuel ratio in the rich, stoichiometric or lean mixture.

The ECU3' provides the air actuator 14 with a control signal indicative of the position of the select valve 11 according to operating status data of the engine E.

Figure 9:
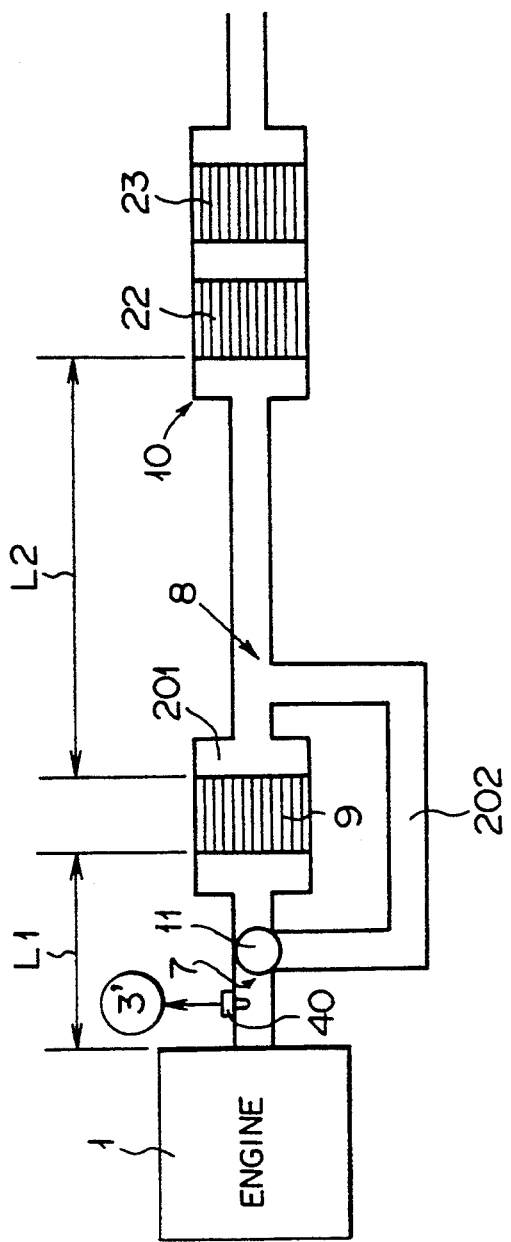
FIG. 9 is a schematic view showing the structure of an exhaust emission control system according to a fourth embodiment of the invention.
Figure 10:
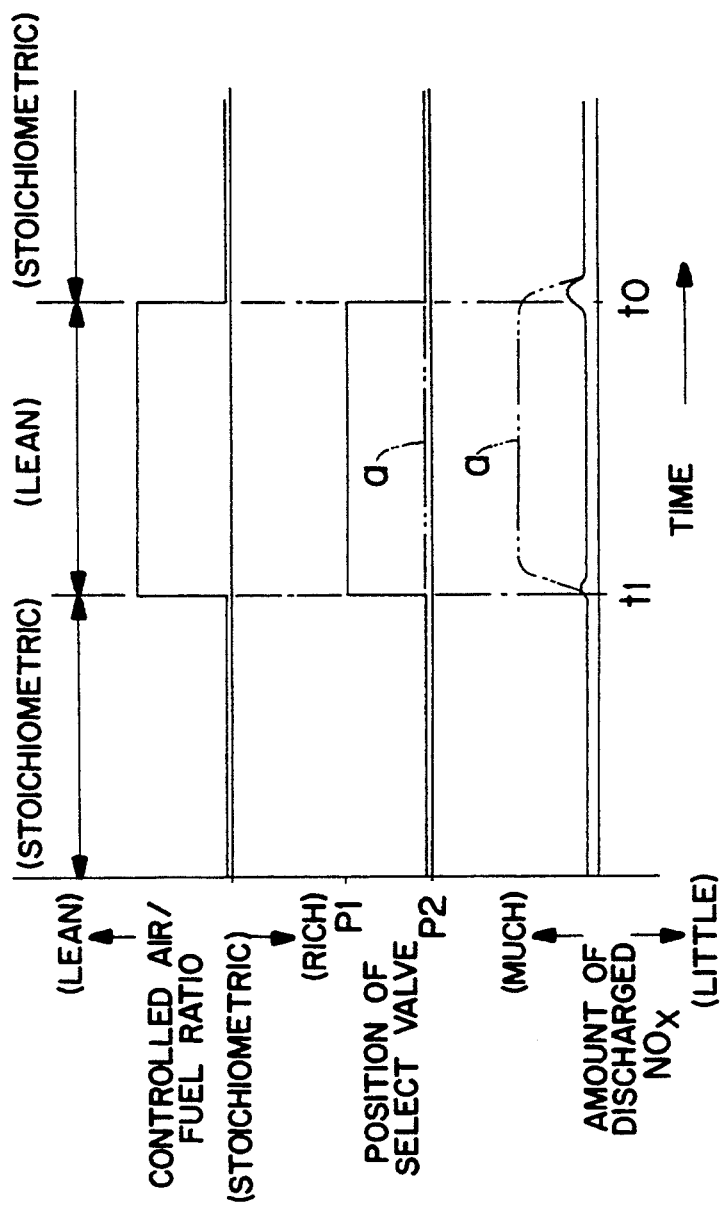
FIG. 10 is shows the amount of NOx discharged by the exhaust emission control system of FIG. 9.

The operation of the exhaust emission control system of FIG. 9 will be described with reference to the control program of the ECU3' (FIG. 11) and FIG. 10 showing the amount of discharged NOx.

When the ignition key is turned on, the ECU3' starts the main routine as usual and advances to the select valve control process.

Figure 11:
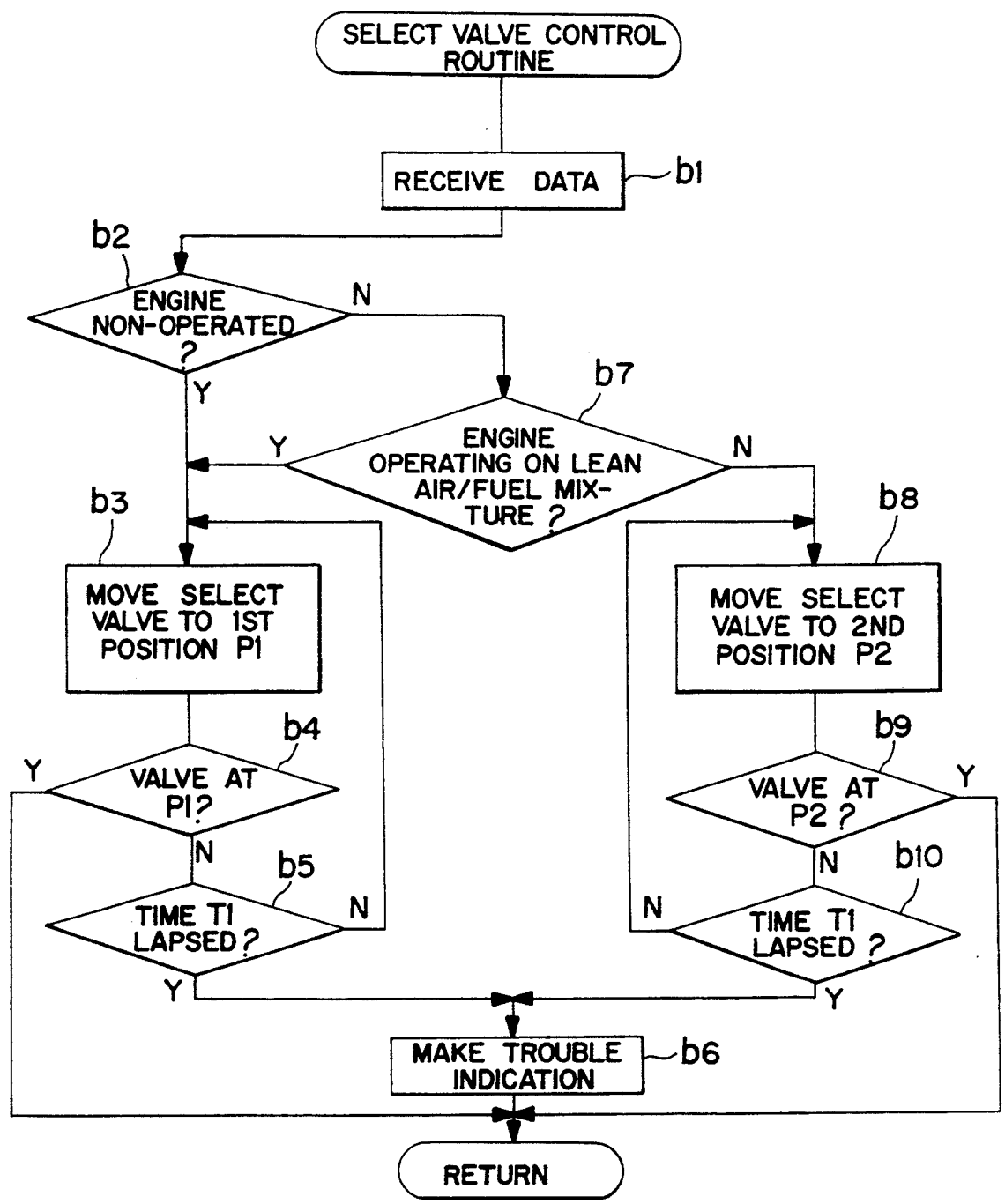
FIG. 11 is a flow chart of a select valve control routine carried out by the ECU of the exhaust emission control system of FIG. 9.

In the routine shown in FIG. 11, the ECU3' reads data from various sensors and stores them in specified areas. Then, the ECU 3 checks whether or not an engine speed Ne is below the predetermined value Ne1 indicative of non-operation of the engine. When the engine speed Ne is below Ne1, the ECU 3 determines that the engine is non-operated, and advances to step b3. The ECU 3 keeps the output for the duty valve 15 to the ratio 0% so that the duty valve 15 is made to stay at the first position P1 to close the upstream main path 201. Thereafter, the duty valve 15 is closed. The negative pressure room is released to the atmosphere, thereby moving the select valve 11 to the first position P1.

In steps b4 and b5, the ECU 3' waits until the select valve 11 reaches the first position P1. When it finds, the arrival of the select valve 11 at the position P1 based on the output from the valve opening sensor 19, the ECU3' returns. When the select valve 11 does not reach the position P1 in the time T1, the ECU3' sends the output indicative of trouble in step b6, and returns.

When the engine is found in step b2 to be operating, the ECU3' advances to step b7, where the ECU3' receives the air/fuel ratio information according to the output of the linear air/fuel ratio sensor 40, and checks whether or not the air/fuel ratio is on the lean side. At an instant the air/fuel ratio is changed to the stoichiometric or rich side from the lean side (e.g. at the time point "to" in FIG. 10), the ECU3' goes to step b8. Then, the ECU3' switches the select valve 11 to the second position P2 to open the upstream main path 201 and close the bypass 202, and advances to steps b9 and b10. In these steps, the ECU3' waits until the select valve 11 reaches the position P2. Detecting the arrival of the select valve 11 according to the output of the valve opening sensor 19, the ECU3' returns. When the select valve does not reach the position P2 within the time T1, the ECU3' advances to step b6, where it sends the output indicative of the trouble, and returns.

On the other hand, when it is found in step b7 the engine operates on a lean air/fuel mixture (e.g. at the time point "t1" in FIG. 10), the ECU3' goes to step b3 so as to move the select valve 11 to the position P1, thereby opening the bypass 202 completely and closing the upstream main path 201.

Thus, when the engine operates on a lean air/fuel mixture, the upstream main path 201 is closed to prevent the first catalyst 9 from consuming HC, and the bypass 202 is completely opened to introduce the exhaust gas to the lean NOx catalyst 22 directly from the combustion chamber 101. Therefore, the lean NOx catalyst 22 can function efficiently when the air/fuel mixture is lean. In FIG. 10, a dash-and-two-dot line a represents the amount of discharged NOx when the select valve 11 is kept at the position P1 at the time point t1.

When the engine is non-operated, the select valve 11 is kept at the position P1 not to introduce the exhaust gas to the first catalyst 9. Therefore, even when the select valve 11 is made to stay at the first position P1 for a long time of time because of trouble such as disconnection of the control circuitry, and sticks to the inner wall of the exhaust pipe, the bypass 202 is opened to continuously supply HC to the lean NOx catalyst 22. Thus, the lean NOx catalyst 22 can purify NOx reliably as usual, and the first catalyst 9 is protected against heat since the upstream main path 201 remains closed. Since the select valve 11 is designed to be held at the position P1 in case of trouble, the exhaust emission control system can maintain function as usual.

The exhaust emission control system of FIG. 9 can hold the select valve 11 at the position P1, P3 or P2 according to the operating status information of the internal combustion engine. When the engine operates on a lean air/fuel mixture, the select valve is at the position to open the bypass, and moved to the position to introduce the exhaust gas when the air/fuel mixture is not lean. During the engine operation with the lean air/fuel mixture, the exhaust gas including HC is supplied to the lean NOx catalyst via the bypass. Thus, the lean NOx catalyst can maintain a high purification ratio.

In the embodiment of FIG. 9, the ECU3' controls the operation of the select valve 11 according to the air/fuel ratio. Especially, when the engine is worming up, the select valve 11 can be moved to the first position P1, the intermediate position P3, or the third position P2 according to the time lapse. In such a case, it is possible to promote the exhaust gas purification quickly after the engine is started. After the warm-up, the exhaust emission control system can operate as efficiently as the system shown in FIG. 1.

Figure 12:
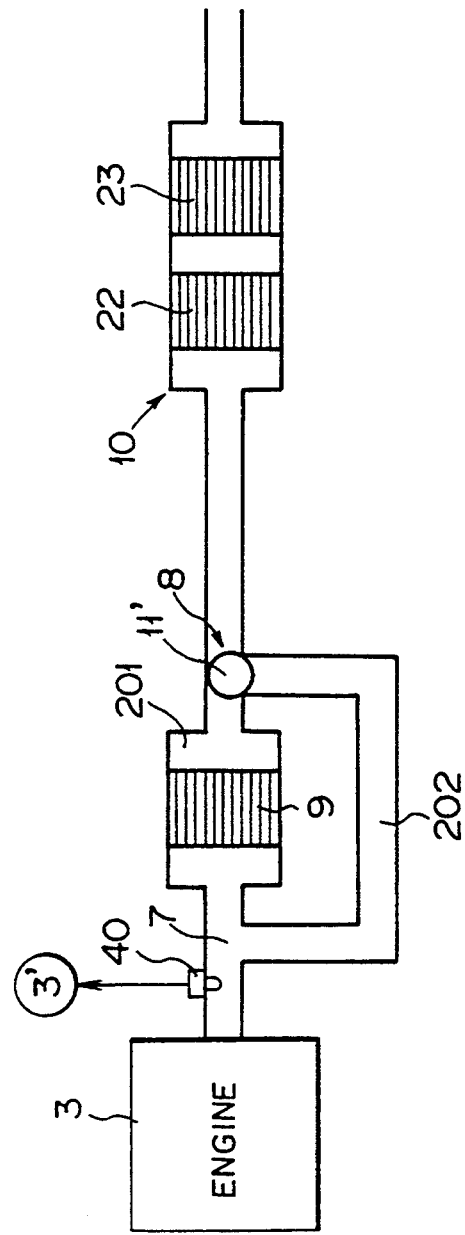
FIG. 12 is a schematic view showing the structure of the exhaust emission control system according to a fifth embodiment of the invention.

In the embodiment of FIG. 9, the select valve 11 is disposed at the portion 7 of the upstream exhaust pipe 5. Alternatively, the select valve 11' may be disposed at the converging 8 downstream of the first catalyst 9 as shown in FIG. 12 (a fifth embodiment). The select valve 11' may have the structure and arrangement as the select-valve 11 shown in FIG. 8. This arrangement is as effective as that accomplished by that shown in FIG. 9.

A sixth embodiment of the invention will be described with reference FIGS. 13 to 17.

In this embodiment, the exhaust emission control system differs from the system of FIG. 1 in that this system includes a linear air/fuel sensor 40 in place of the first catalyst temperature sensor 24, a second bypass 32, a second select valve 27, and an ECU3" which perform control processing differently from the ECU3. Since the other components of this exhaust emission control system are the same as those of the system of FIG. 1, a detailed description thereof will be omitted here.

Figure 13:
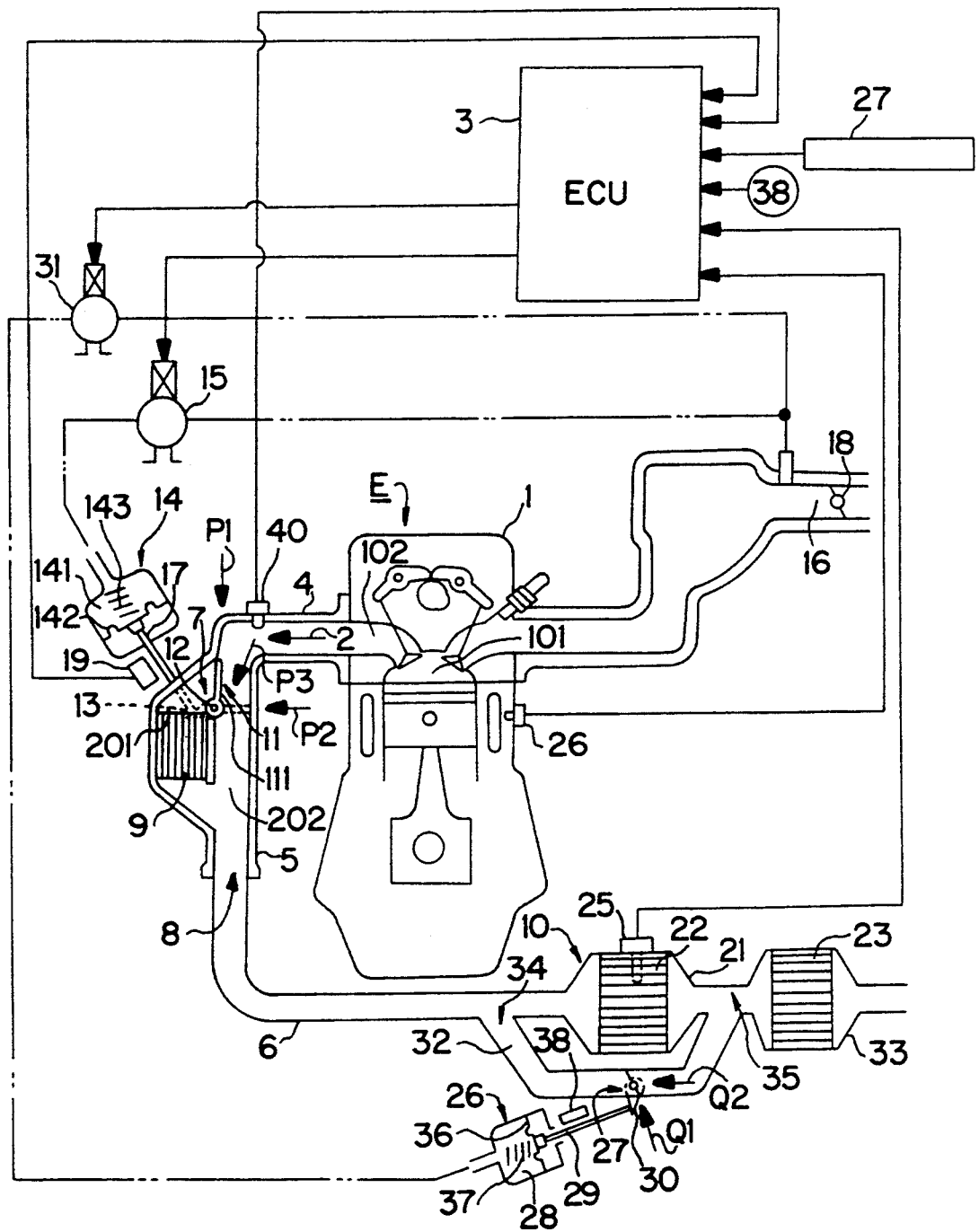
FIG. 13 is a schematic view showing the overall configuration of the exhaust emission control system according to a sixth embodiment of the invention.

Referring to FIG. 13, the exhaust path 2 of the system extends from the exhaust manifold 4 (which is connected to the engine body 1), and includes the upstream exhaust pipe 5, the downstream exhaust pipe 6, and muffler (not shown). The upstream exhaust pipe 5 has the first (warm-up) catalyst 9 and a first bypass 202 detouring the first catalyst 9. The downstream exhaust pipe 6 has the second catalyst 10 and the second bypass 32 which detours the lean NOx catalyst 22 in the second catalyst 10.

The upstream exhaust pipe 5 is divided at the portion 7 into the main upstream path 201 including the first catalyst 9, and the first bypass 202 detouring the first catalyst 9. The paths 201 and 202 converge at the portion 8. The select valve 11 (called as the first valve 11 hereinafter in this embodiment) is positioned at the portion 7 so as to control the amount of the exhaust gas to be introduced into the upstream main path 201 or the first bypass 202. The first select valve 11 is controlled by the ECU3" via the duty valve 15 as described with reference to the embodiment shown in FIG. 1. When the ratio of the duty valve 15 is below the predetermined level, the valve body 111 of the first select valve 11 is urged by the return spring 143 to move to the first position P1 (shown by the solid line in FIG. 13), where the first select valve 11 opens the first bypass 202, and closes the upstream main path 201.

On the contrary, when the ratio of the duty valve 15 is above the predetermined level, the valve body 111 follows the operation of the diaphragm 142 against the return spring 143, and moves in a direction to close the first bypass 202 and open the upstream main path 201. Then, when the ratio of the duty valve 15 exceeds the full-open level, the first select valve 11 reaches the second position P2 (shown by the dash-and-two-dot line in FIG. 13), thereby opening the upstream main path 201 and closing the first bypass 202.

The valve opening sensor 19 is disposed near the link 17, and provides an analog to digital converter (not shown) with an analog output indicative of the position of the first select valve 11. The analog to digital converter provides a digital output to the ECU3".

The first (warm-up) catalyst 9 is a well-known three way catalyst. Alternatively, an oxidation catalyst may be used as the first catalyst in place of the three way catalyst. In such a case, palladium (Pd) catalyst having a low warm-up temperature is usable.

The downstream exhaust pipe 6 includes the second catalyst 10 having the lean NOx catalyst 22 and the three way catalyst 23 disposed along the exhaust path 2, and the second bypass 32 detouring the lean NOx catalyst 22. The lean NOx catalyst 22 and the three way catalyst 23 are housed in cylindrical cases 21 and 33, respectively, which are coupled each other along the downstream exhaust pipe 6. Alternatively, these catalysts 22 and 23 may be housed in a single case (not shown) so as to be compact.

The second bypass 32 branches from the exhaust path 2 at the portion 34 and converges with the exhaust path 2 at the portion 35 (upstream of the three way catalyst 23). The second bypass 32 has a second select valve 27 at the middle thereof. The second select valve 27 opens and closes the second bypass 32. A valve body 271 of the second select valve 27 is a butterfly valve, to which a link 29 of an air actuator 26 is coupled by a pin via a lever 30 integral with the butterfly valve.

The air actuator 26 is similar to the air actuator 14 shown in FIG. 1, and includes a diaphragm 36 to which one end of the link 29 is coupled, a negative pressure chamber 28 with which the diaphragm 36 confronts, and a return spring 37 for pushing the diaphragm 36. The negative pressure chamber 28 communicates via an on/off valve 31 with the air inlet path 16 downstream of the throttle valve 18. A valve opening sensor 38 is disposed near the link 29, provides an analog to digital converter (not shown) with an analog output indicative of the position of the second select valve. The analog to digital converter provides a digital output to the ECU3".

The on/off valve 31 is turned on and off by the ECU3". When it turned off, the valve 31 releases the negative pressure chamber 28 to the atmosphere. Otherwise, the on/off valve 31 increases the pressure in the negative pressure chamber 28. In other words, when the on/off valve 31 is on, the second select valve 27 completely closes the second bypass 202 (shown by the solid line in FIG. 13) and stays at the first position Q1, so that the exhaust gas can be introduced into the lean NOx catalyst 22. Otherwise, the second select valve 27 is held at the second position Q2 to completely open the second bypass 202, so that the exhaust gas can be directly introduced into the three way catalyst 23 without through the lean NOx catalyst 22.

The lean NOx catalyst 22 can reduce NOx in the present of excess oxygen (in the lean air/fuel mixture), and exhibits a high NOx purifying ratio ($\eta_{NOX}$) while HC/CO ratio is above the predetermined level. Specifically, the lean NOx catalyst 22 reduces NOx by using HC as a reductant when the exhaust gas has a lean air/fuel ratio and is hot enough to activate the lean NOx catalyst 22, so that a nontoxic gas will be discharged.

The three way catalyst 23 is much larger than the first catalyst 9, and includes conventional catalytic active substance which can reduce oxygen in the stoichiometric air/fuel mixture. The second catalyst 10 comprising the lean NOx catalyst 22 and the three way catalyst 23 can effectively purify the exhaust gas.

As shown in FIG. 14(a), the length L2 between the first catalyst 9 and the second catalyst 10 is longer than the length L1 between the combustion chamber 101 of the engine and the first catalyst 9, thereby improving the performance of the first catalyst 9 and making the lean NOx catalyst 22 more durable.

The ECU3" is mainly a microcomputer, and serves a as a control unit which sends the air actuators 14 and 26 signals indicative of the positions of the first and second select valves 11 and 27 in response to operating status data of the engine E.

The ECU3" has an access to not only the valve opening sensor 19 but also sensors such as the linear air/fuel ratio sensor 40 for detecting the air/fuel ratio of the exhaust gas, the second catalyst temperature sensor 25, the water temperature sensor 26 connected to the engine body 1, and the engine speed sensor 27, and receives various detected signals from these sensors.

The operation of the exhaust emission control system of FIG. 13 will be described with reference to ECU3" control program (shown in FIGS. 16 and 17) and the wait time calculating map of FIG. 3.

When the ignition key is turned on, the ECU3" starts the well-known main routine, and advances to the select valve control procedure.

Figure 15:
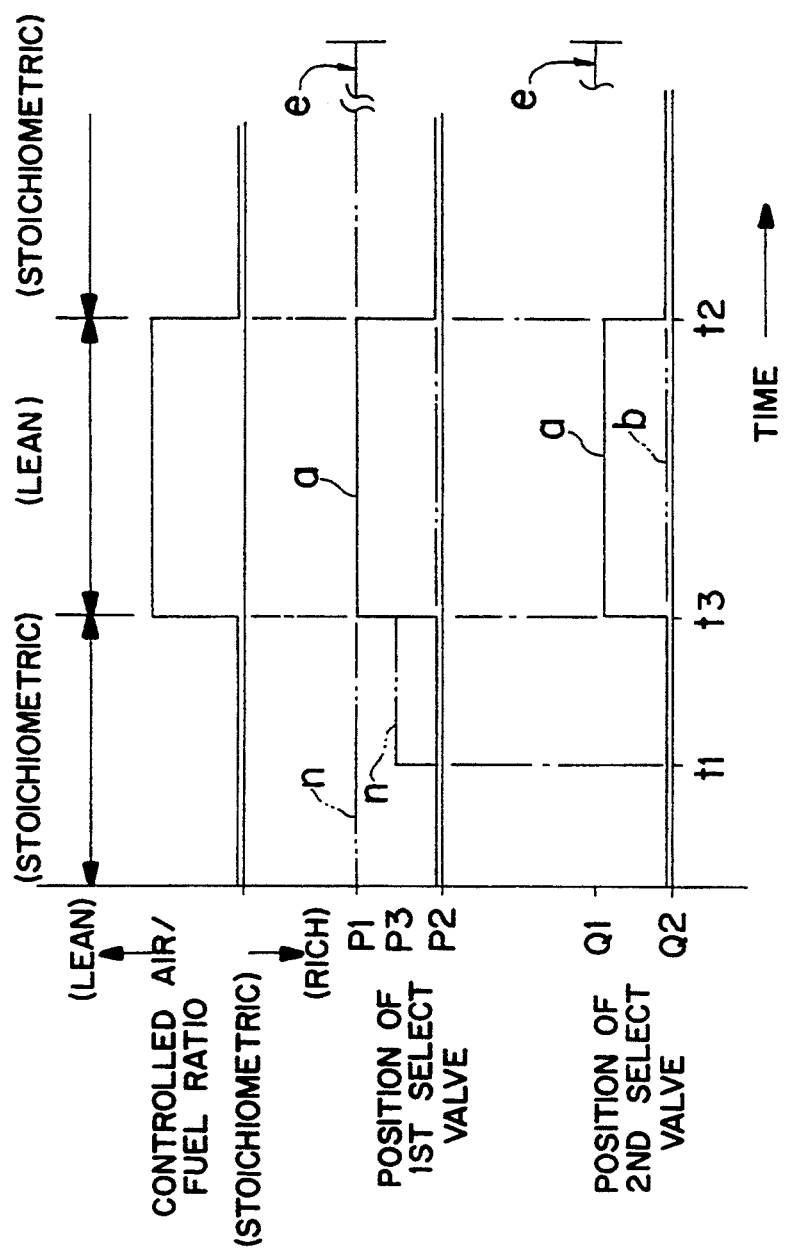
FIG. 15 shows the operation of select valves of the system of FIG. 13.
Figure 16:
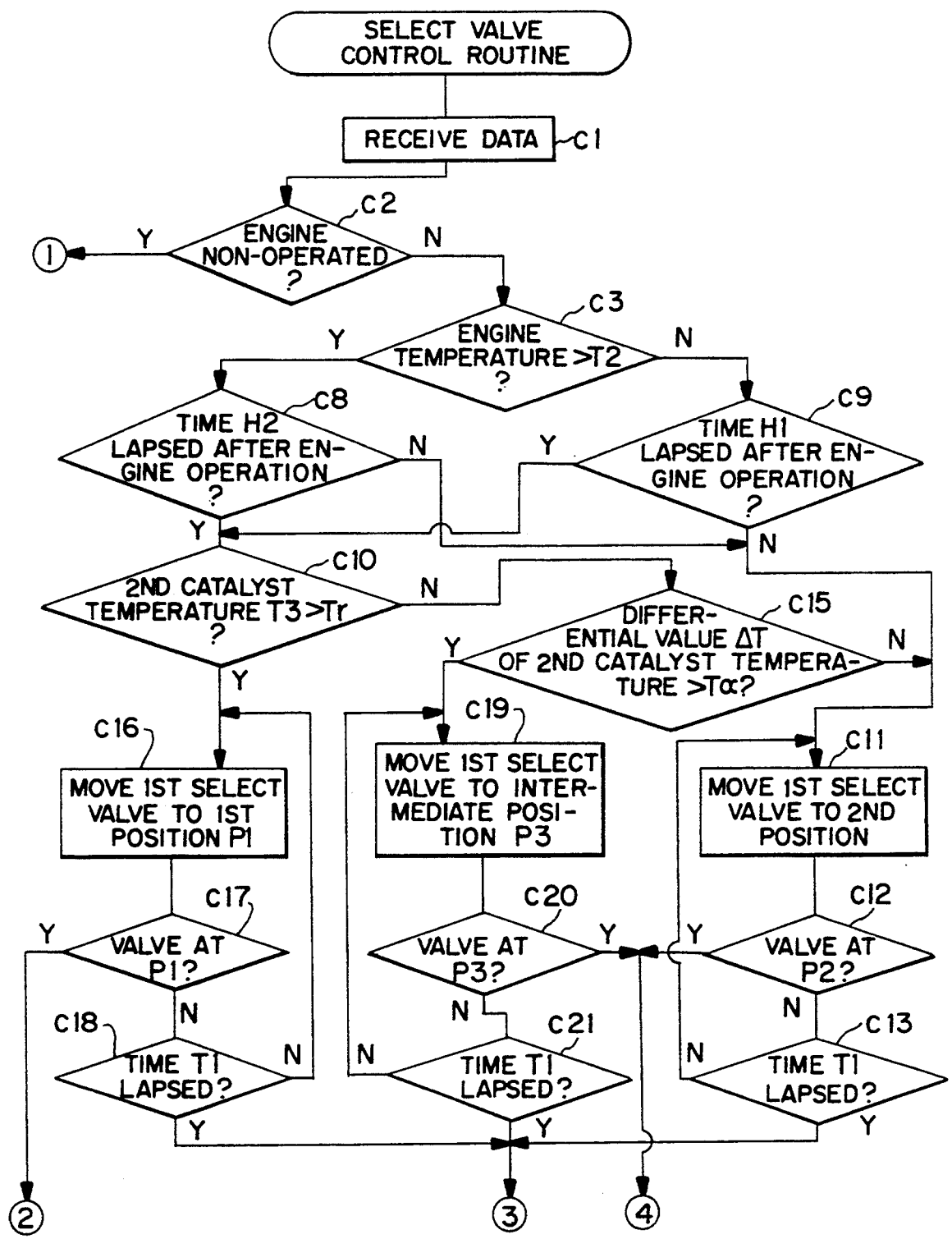
FIG. 16 is a first part of a select valve control routine carried out by the ECU of the system of FIG. 13.
Figure 17:
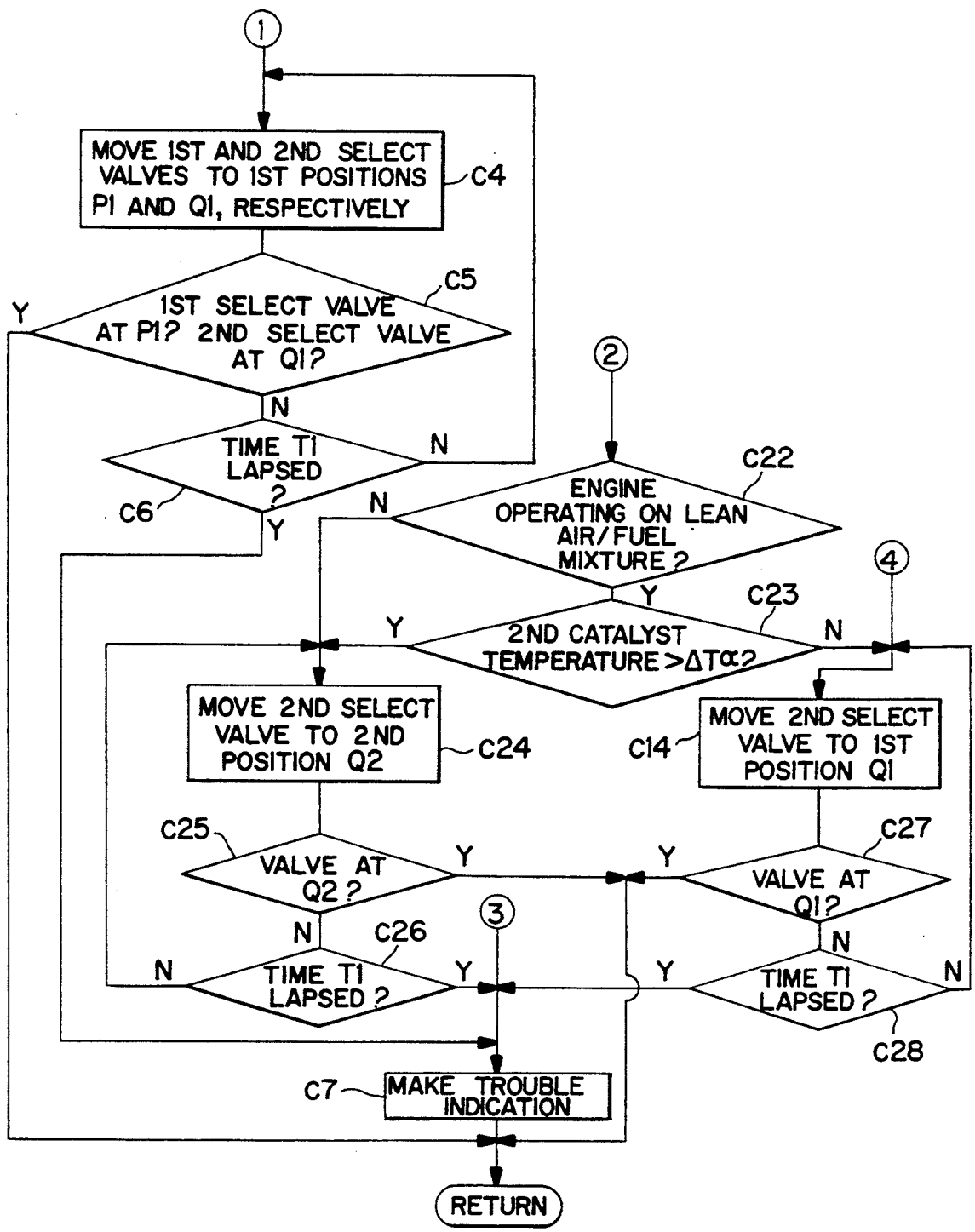
FIG. 17 is a second part of the select valve control routine carried out by the ECU of the system of FIG. 13.

Referring to FIGS. 16 and 17, the ECU3" reads data from various sensors, and store them in specified areas. The ECU3" checks whether or not an engine speed Ne is below the predetermined value Ne1 indicative of non-operation of the engine. When the engine speed Ne is below Ne1, the ECU3" judges that the engine is non-operated, and keeps the output for the duty valve 15 have the ratio 0% so as to move the select valve 11 to the first position P1 for closing the upstream main path 201. Thereafter, the duty valve 15 is closed. The negative pressure chamber 28 is released to the atmosphere, thereby holding the first select valve 11 at the position P1. At the same time, the ECU3" sends an output to operate the on/off valve 31. Then, the negative pressure chamber 28 is further negatively pressurized, thereby moving the second select valve 27 to the first position Q1 (shown at "e" in FIG. 15).

In step c5, the ECU 3" waits until the first and second select valves 11 and 27 reach the first and positions P1 and Q1, respectively. When it finds the arrival of the select valves 11 and 27 at the positions P1 and Q1 based on the outputs from the valve opening sensors 19 and 37, the ECU3" returns. When the select valves 11 and 27 do not reach their destinations in the time T1, the ECU3" sends the output indicative of trouble in step b7, and returns.

When the engine is found in step c2 to be operating, the ECU3" advances to step c3, where the ECU3" reads an output indicative of the engine temperature from the water temperature sensor 26. Then ECU3" checks whether the engine temperature is above the value T2 indicative of completion of engine warm-up. When the engine temperature is below T2, the ECU3" advances to step c9. Otherwise, the ECU3" advances to step c8. In step c9, the ECU3" reads a relatively long wait time H1 from the wait time calculating map of FIG. 3. During the wait time H1, the ECU3" goes to step c11 where it moves the first select valve 11 to the second position P2 to open the upstream main path 201 and close the bypass 202. After lapse of the wait time H1, the ECU3" goes to step c10.

In steps c12 and c13, the ECU3" waits until the first select valve 11 reaches the second position P2, and detects the arrival of the first select valve 11 at the position P2 according to the output from the valve opening sensor 19. Then ECU3" advances to step c14. When the first select valve 11 does not reach the position P2 in the time T1, the ECU3" advances to step c7 to emit an output indicative of trouble, and returns.

When the ECU3" goes to step c8 after finding that the engine temperature is above the value T2, the ECU3" reads a relatively short wait time H2 from the wait time calculating map. During the wait time H2, the ECU3" goes to step c11, where it moves the first select valve 11 to the second position P2 to open the upstream main path 201 and close the bypass 202. After lapse of the time H2, the ECU3" advances to step c10, where it receives the exhaust gas temperature T3 in the second catalyst 10 from the second catalyst temperature sensor 25. When the exhaust gas temperature T3 is below the active temperature Tr of the second catalyst 10, the ECU3" goes to step c15. Otherwise, the ECU3" goes to step c16.

In step c15, the ECU3" calculates a differential value $|\Delta T| (= |\Delta T_{n-1} - \Delta T_n)$ of the exhaust gas temperature T3 of the second catalyst 10, and checks whether $\Delta T$ is above the value $\Delta T\alpha$ corresponding to a temperature gradient indicative of the active temperature Tf of the first (warm-up) catalyst 9. When $\Delta T$ is below $\Delta T\alpha$, the ECU3" advances to step c11, where it keeps the first select valve 11 at the second position P2 to open the upstream main path 201 and to raise the temperature of the first catalyst 9. On the other hand, when $\Delta T$ is above $|\Delta T\alpha$, the ECU3" advances to step c19, where it moves the first select valve 11 to the intermediate position P3 (e.g. shown at "n" in FIG. 15 when this condition is attained at the time point t1 during the operation of the engine in the stoichiometric air/fuel mixture), thereby starting to heat the bypass 202.

In the embodiment shown in FIG. 13, the first select valve 11 is controlled according to only the temperature detected by the second catalyst temperature sensor 25. Alternatively, it is possible to control the first select valve 11 in response to the output from the first catalyst temperature sensor disposed in the first (warm-up) catalyst 9.

In steps c20 and c21, the ECU3" waits until the first select valve 11 gets to the intermediate position P3, and returns after receiving from the valve opening sensor 19 an output indicative of the arrival of the first select valve 11 at the position P3. If the first select valve 11 does reach the position P3 in the time T1, the ECU3" goes to step c7, sends an output indicative of trouble, and returns.

When it is found in step c10 that the second catalyst temperature T3 is above its active temperature Tr, the ECU3" goes to step c16, where it moves the first select valve 11 to the first position P1 shown by a dash-and-two-dot line m in FIG. 15. In steps c17 and c18, the ECU3" waits until the first select valve 11 gets to the position P1. Detecting the arrival of the first select valve 11 at the position P based on the output from the valve opening sensor 19, the ECU3" advances to step c22. If the first select valve 11 does not reach the position P1 in the time T1, the ECU3" advances to step c7 to send the output indicative of trouble, and returns.

In step c22, the ECU3" receives the air/fuel ratio information from the linear air/fuel ratio sensor 40, and checks whether the air/fuel ratio is on the lean side.

When the air/fuel ratio is on the lean side, the ECU3" goes to step c23. When the air/fuel ratio is changed to the stoichiometric or rich side (e.g. at the time point t2 shown in FIG. 15), the ECU3" advances to step c24, where it maintains the second select valve 27 at the second position Q2 to open the second bypass 32, and advances to steps c25 and c26. Then the ECU3" waits until the second select valve 27 reaches the second position Q2, and returns after detecting the arrival of the second select valve 27 at the position Q2 according to the output of the valve opening sensor 19. When the second select valve 27 does not reach the position Q in the time T1, the ECU3" goes to step c7, where it sends the output indicative of trouble, and returns. The second select valve 27 is maintained at the second position Q2 so as to prevent the exhaust gas from flowing into the lean NOx catalyst 22 when the engine is operating on the stoichiometric or rich air/fuel mixture, thereby making the lean NOx catalyst 22 more durable.

When the ECU3" finds in step c22 that the engine is operating on the lean air/fuel mixture and goes to step c23, the ECU3" receives the exhaust gas temperature in the lean NOx catalyst 22 from the second catalyst temperature sensor 25. The ECU3" judges that the exhaust gas temperature is above the predetermined value allowable for the second catalyst, i.e. $T_{MAX}$ indicative of the highest temperature value. When the exhaust temperature is above $T_{MAX}$, the ECU3" advances to step c24, where it opens the second bypass 32 (shown by dash-and-two-dot line b in FIG. 15) so as to keep the lean NOx catalyst 22 from being damaged by a high temperature. Otherwise, the ECU3" advances to step c14, where it moves the second select valve 27 to the first position Q1 to close the second bypass 32 and supply a lean exhaust gas to the lean NOx catalyst 22. Thereafter, the ECU3" advances to steps c27 and c28, where it waits until the second select valve 27 reaches the first position Q1, and returns after detecting the arrival of the second select valve 27 according to the output from the valve opening sensor 19. When the second select valve 27 does not reach the first position Q1 in the time T1, the ECU3" goes to the step c7, sends the output indicative of trouble, and returns.

As described so far, when the engine is operating on the lean air/fuel mixture, the first select valve 11 is moved to the first position P1 in step c16 so that the first (warm-up) catalyst 9 does not consume HC and that the second bypass 32 is closed to directly introduce the exhaust gas to the lean NOx catalyst 22 from the combustion chamber 101. Therefore, unless the lean NOx catalyst 22 is overheated, i.e. the exhaust gas temperature is below $T_{MAX}$, the lean NOx catalyst 22 can effectively purify NOx. In FIG. 15, the solid line a represents the state in which the first and second select valves 11 and 27 are held at the first positions P1 and Q1, respectively, at the time point t3.

In this embodiment, when the engine is not operating, the first select valve 11 is held at the first position. P1, and the second select valve 27 is held at the first position Q1. Under this condition, no exhaust gas flows to the warm-up catalyst 9. Even when the first select valve 11 is held at the position P1 for a long time of time and sticks to the inner wall of the exhaust pipe, the first bypass 202 is opened to introduce HC to the lean NOx catalyst 22. Therefore, the lean NOx catalyst 22 can purify NOx reliably. Furthermore, the upstream main path 201 remains closed to prevent the warm-up catalyst 9 from being damaged by heat. The first select valve 11 is designed to be held at the position P1 in case of trouble, so that the exhaust emission control system can function as usual. The second select valve 27 of FIG. 13 is moved to the first position Q1 when the on/off valve 31 is operated. Alternatively, the second select valve 27 may be moved to the first position Q1 when the on/off valve 31 is released. In this case, since the first bypass 202 is opened and the second bypass 32 is closed during the non-operation of the engine, the lean NOx catalyst 22 can maintain its reliable performance even while the valves 11 and 27 are held at the positions P1 and Q1, respectively. Therefore, the exhaust emission control system can function as usual.

In the embodiment shown in FIGS. 13 and 14(a), the first select valve 11 is positioned at the portion 7 of the upstream exhaust pipe 5, and the second select valve 27 is in the middle of the second bypass 32. Alternatively, the first select valve 11 may be positioned at the converging portion 8, and the second select valve may be at the converging portion 35 of the second bypass 32. This structure and arrangement (a seventh embodiment) can assure the similar advantage and efficiency as those accomplished by the exhaust emission control system shown in FIG. 13.

In this seventh embodiment, it is possible to control the first select valve 11 to the first, intermediate or second position P1, P3 or P2 in response to time elapsed during the warm-up period of the engine. In this case, the exhaust emission control system can purify the exhaust gas early, and is as effective as the system of FIG. 13 after the engine is warmed up. Furthermore, the first select valve 11 may be controlled according to the time lapse after the engine activation and the temperature of the second catalyst. Although the second select valve 27 is controlled according to the air/fuel ratio and the temperature of the second catalyst, it may be controlled according to only the air/fuel ratio. In addition, the second select valve 27 may be controlled according to the temperature of the exhaust gas near the second catalyst.

In the exhaust emission control system of FIG. 13, the first select valve controls the amount of exhaust gas to the first bypass or the first catalyst, while the second select valve 27 controls the amount of exhaust gas to the second bypass or the lean NOx catalyst. Therefore, it is possible to regulate the amount of the exhaust gas to the lean NOx catalyst in response to the operating status data of the engine. The lean NOx catalyst in the second catalyst can function efficiently for a long period of time.

What is claimed is:

1. An exhaust emission control system comprising:
   a) a first catalyst for purifying an exhaust gas at an initial stage of engine operation, the first catalyst being disposed in an exhaust path near an internal combustion engine;
   b) a second catalyst disposed downstream of the first catalyst, the second catalyst including a lean NOx catalyst for purifying nitrogen of oxides in a lean exhaust gas;
   a first bypass detouring the first catalyst and converging with the exhaust path upstream of the second catalyst;
   a first select valve for controlling an amount of exhaust gas to be introduced to the first bypass and the first catalyst; and control means for providing the first select valve with signals indicative of positions of the first select valve.

2. An exhaust emission control system of claim 1, wherein the second catalyst includes the lean NOx catalyst and a three way catalyst disposed along a flow direction of the exhaust gas.

3. An exhaust emission control system of claim 1, wherein the first catalyst is a three way catalyst.

4. An exhaust emission control system of claim 1, wherein the first catalyst is an oxidation catalyst.

5. An exhaust emission control system of claim 1, wherein the control means includes an engine non-operation judging means, for controlling the first select valve to a position for opening the first bypass when the engine non-operation judging means judges non-operation of the engine.

6. An exhaust emission control system of claim 1, wherein the control means includes an engine warm-up completion judging means, for controlling the first select valve to a position for closing the first bypass when the engine warm-up completion judging means judges that the engine has not been warmed up.

7. An exhaust emission control system of claim 1, wherein the control means includes a first catalyst activation judging means and a second catalyst activation judging means, for controlling the first select valve to an intermediate position when the first catalyst activation judging means recognizes activation of the first catalyst and when the second catalyst activation judging means does not recognize activation of the second catalyst.

8. An exhaust emission control system of claim 7, wherein the first catalyst activation judging means judges the activation of the first catalyst according to a temperature of the first catalyst or a temperature of the exhaust gas around the first catalyst detected by a first catalyst temperature sensor, and the second catalyst activation judging means judges the activation of the second catalyst according to a temperature of the second catalyst or a temperature of the exhaust gas around the second catalyst detected by a second catalyst temperature sensor.

9. An exhaust emission control system of claim 7, wherein the second catalyst activation judging means judges the activation of the second catalyst according to a temperature of the second catalyst or a temperature of the exhaust gas around the second catalyst detected by the second catalyst temperature sensor, and the first catalyst activation judging means judges the activation of the first catalyst according to a differential value of a temperature value detected by the second catalyst temperature sensor.

10. An exhaust emission control system according to claim 1, wherein the control means includes a lean air/fuel ratio judging means, for controlling the first select valve to a position for opening the first bypass when the engine is operating on a lean air/fuel mixture, and control the first select valve to a position for introducing the exhaust gas into the first catalyst when the engine is operating on an air/fuel mixture having an air/fuel ratio other than the lean air/fuel ratio.

11. An exhaust emission control system according to claim 1, wherein the control means controls the first select valve according to time lapse after the operation of the engine.

12. An exhaust emission control system of claim 1, further comprising a second bypass detouring the lean NOx catalyst in the second catalyst and converging the exhaust path, and a second select valve for controlling the amount of exhaust gas to be introduced to the second bypass or the lean NOx catalyst, wherein the control means controls positions of the first and second select valves.

13. An exhaust emission control system of claim 12, wherein the control means includes a lean air/fuel ratio judging means, for controlling the first select valve to a position for opening the first bypass and controls the second select valve to a position for closing the second bypass when the lean air/fuel ratio judging means recognizes that the engine is operating on a lean air/fuel mixture.

14. An exhaust emission control system of claim 12, wherein the control means includes an engine non-operation judging means, for controlling the first select valve to a position for opening the first bypass and controls the second select valve to a position for closing the second bypass when the engine non-operation judging means judges non-operation of the engine.

15. An exhaust emission control system of claim 12, wherein the control means includes a second catalyst temperature sensor for detecting a temperature of the lean NOx catalyst or a temperature of exhaust gas around the lean NOx catalyst, and controls the second select valve to a position for opening the second bypass when a temperature detected by the second catalyst temperature sensor is above a predetermined value.

16. An exhaust emission control system of claim 1, wherein the first select valve is disposed upstream of the first catalyst.

17. An exhaust emission control system of claim 1, further comprising: an air actuator which drives the first select valve and includes the air actuator including a negative pressure chamber, a diaphragm coupled to the first select valve and a return spring for pushing the diaphragm; and a valve which raises a negative pressure in the negative pressure chamber, closes the first bypass against a force of the return spring and controls supply of the negative pressure in response to a control signal from the control means.

18. An exhaust emission control system of claim 17, wherein the valve releases the negative chamber to the atmosphere when the engine is non-operated or when no control signal arrives, and the first select valve opens the first bypass by the force of the return spring.

* * * * *